US006252653B1

United States Patent
Burgess et al.

(10) Patent No.: US 6,252,653 B1
(45) Date of Patent: Jun. 26, 2001

(54) ROTARY THERMAL DESENSITIZER OF DEVELOPER FOR PHOTOSENSITIVE COPY SHEET MATERIAL

(75) Inventors: Dennis M. Burgess, Wayzata; William J. Campbell, Minnetonka, both of MN (US)

(73) Assignee: Burgess Industries Inc., Plymouth, MN (US)

( * ) Notice: Subject to any disclaimer, the term of this patent is extended or adjusted under 35 U.S.C. 154(b) by 0 days.

(21) Appl. No.: 09/415,248

(22) Filed: Oct. 12, 1999

(51) Int. Cl.[7] .......... G03B 27/32; G03B 27/00; B41J 2/315

(52) U.S. Cl. .......... 355/407; 355/405; 355/27; 347/221

(58) Field of Search .......... 355/27–29, 40–41, 355/405–407; 347/262–264; 399/297–299, 303

(56) References Cited

U.S. PATENT DOCUMENTS 2,988,979 6/1961 Sigler .
3,524,397 8/1970 Hruby .
3,632,208 1/1972 Bach .
4,068,249 1/1978 Degenhardt et al. .
4,092,658 5/1978 Schroter .
4,109,268 8/1978 Schroter .
4,135,814 1/1979 Schroter .
4,166,728 9/1979 Degenhardt et al. .
4,167,319 9/1979 Feitzinger et al. .
4,182,567 1/1980 Laar et al. .
4,255,037 3/1981 Meadows et al. .
4,289,394 9/1981 Michel .
4,303,329 12/1981 Michlin .
4,358,193 11/1982 Hale .
4,518,845 * 5/1985 Svendsen .......... 219/216
4,659,927 4/1987 Tago et al. .
4,660,964 4/1987 Yoshikawa et al. .
4,737,822 * 4/1988 Taniguchi et al. .......... 355/27
5,283,611 * 2/1994 Kobayashi et al. .......... 355/27
5,840,381 * 8/2000 Ohtsuka .......... 428/34.4
5,946,025 * 8/1999 Allen .......... 347/262
6,097,475 * 8/2000 Jakul et al. .......... 355/72

OTHER PUBLICATIONS

Commercial Product: A developer for heating sheet material was produced by applicants' assignee prior to 1997; the developer lacked a slip sheet of tray of condensation–inhibiting material as well as differential heating.

(List continued on next page.)

*Primary Examiner*—Russell Adams
*Assistant Examiner*—Hung Henry Nguyen
(74) *Attorney, Agent, or Firm*—James V. Harmon

(57) ABSTRACT

A rotary apparatus for applying heat to develop an image on photosensitive copy paper or to desensitize the photosensitive paper against further exposure to light includes an elongated supporting framework including a base having a roll support stand at each end with spaced apart bearings for supporting a drive roll that is provided with a high friction, e.g. a rubber coated, surface. A drive motor is connected to the drive roll for rotating the drive roll, a hot shoe is supported on the framework adjacent to the roll, and a slip sheet is mounted between the hot shoe and the drive roll to provide a low friction surface for allowing the photosensitive sheet to slide easily through the apparatus as it is carried forward by frictionally contact with the drive roll. The hot shoe and slip sheet are both held in a fixed position. The bearings for the drive roll are able to be moved radially with respect to the axis of the drive roll and then secured, i.e. locked in a selected position with respect to the hot shoe. A condensation-inhibiting outlet tray is provided for receiving the sheet material as it passes out of the apparatus. A dead air space is provided in the roll stand at each end of the roll, and a housing is supported laterally of each dead air space for enclosing a drive motor and a temperature controller.

23 Claims, 6 Drawing Sheets

OTHER PUBLICATIONS

Commercial Product: A developer for heating photographic film was produced by applicants' assignee prior to 1997 but this developer could only process photographic film 4" or less in width and lacked a slip sheet or tray of condensation–inhibiting material as well as differntial heating. It has no dead air space for reducing heat loss at each end of the drive roll.

* cited by examiner

ROTARY THERMAL DESENSITIZER OF DEVELOPER FOR PHOTOSENSITIVE COPY SHEET MATERIAL

FIELD OF THE INVENTION

This invention relates to equipment for desensitizing or developing photosensitive copy sheet material in which the sheets are advanced past a heat source by rotation of a roller.

BACKGROUND OF THE INVENTION

A variety of equipment has been previously available for developing or desensitizing, i.e. fixing, photosensitive sheet material, but the prior equipment has not been entirely satisfactory. The term "developing" herein means to make visible a latent image or one that is barely visible, as in the diazo copying process. The term "desensitization" or "fixing" herein means to render a photosensitive copy sheet resistant to visible changes upon further exposure to light.

While the invention has broad utility, it is particularly useful in a process known as (1) "imposition or position proofing," i.e. proofing of graphic material to determine quickly how graphic material will appear when later printed on a printing press. Position proofing can be accomplished with either positive or negative (2) sensitized paper or laminated emulsions. In this process, an exposed sheet of transparent photographic film (one containing an image) is placed in contact with a sheet of the photosensitive copy paper that is to be later processed using the present invention. The superimposed sheets are then exposed to ultraviolet light to transfer the image from the film to the copy paper. The copy paper is, however, still sensitive to room light and, in order to be stabilized, must be fixed or desensitized. Desensitization is then accomplished by passing the copy sheet through the present invention. One example of photosensitive sheet material of this type is sold commercially by Fuji Photofilm USA, Inc. of Itasca, Ill., under the name Fuji Copyart™ CP3. Heat developable photosensitive sheet material is also described in a Japanese patent to Fuji, laid open #278849/1986. A further example is a positive Copyart™ Paper by Fuji Photofilm USA, Inc. Other heat developable or heat desensitizable photosensitive sheets that can be employed in connection with the invention are commercially available and are well known to those skilled in the art. In general, the present invention can be used for processing any paper or sensitized material that employs a thermal process to fix or desensitize graphic images for providing a broad tone range and clear color breaks allowing the printer to achieve more clear and accurate proofing prior to a monochromatic or multicolor press run.

In these prior applications, a number of deficiencies have been experienced. In the past, difficulties have been encountered in achieving uniformity when treating large sheets, e.g. sheets measuring 36 inches or more in width. Desensitization was sometimes inconsistent from one portion of the copy sheet to another. Maintaining consistent results over a period of time, e.g. from the beginning of a run to the end of the run has also been difficult to accomplish in the past.

It is therefore a general objective of the invention to provide an apparatus for developing or desensitizing photosensitive sheet material in which the degree of development or desensitization is consistent over time and from one portion of the copy of sheet to another.

A more specific object is to effect treatment of photosensitive copy sheets by the application of heat with a temperature variation no greater than about +5° F. and most preferably no greater than about of +2.5° F.

Another object is to prevent undesirable temperature variations that have occurred in the past across the width of the sheet, i.e. in the cross-machine direction.

A further object is to provide an apparatus of the type described that is rugged in construction, low in cost, and reliable in applying heat uniformly to all portions of the sheet material being processed.

Another object is to provide cabinetry that will prevent the operator from accidentally coming into contact with the heater or other portions of the machine that could burn the skin or is hot to the touch, or could overheat components, e.g. electronic controls or drive motor.

A further object is to prevent damage to the photosensitive sheet material caused by moisture that is liberated during treatment.

Still another object is to isolate the heating element from the mechanical components and drive train for long life and operation.

Yet another object is to reduce processing time by employing relatively a high processing temperatures but without deleterious effects previously caused by overheating.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a rotary apparatus for applying heat to develop an image on photosensitive copy paper or to desensitize the photosensitive paper against further exposure to light. The apparatus includes an elongated supporting framework including a base having a roll support stand at each end with spaced apart bearings for supporting a drive roll that is provided with a high friction, e.g. a rubber coated, surface. A drive motor is coupled to the drive roll for rotating the drive roll, a hot shoe is supported on the framework adjacent to the roll, and a slip sheet is mounted between the hot shoe and the drive roll to provide a low friction surface for allowing the photosensitive sheet to slide easily through the apparatus as it is carried forward by frictionally contact with the drive roll. The hot shoe and slip sheet are both held in a fixed position. However, the bearings for the drive roll are able to be moved radially with respect to the axis of the drive roll and then secured, i.e. locked in a selected position with respect to the hot shoe. A condensation-inhibiting outlet tray is provided for receiving the sheet material as it passes out of the apparatus. A dead air space is provided in the roll stand at each end of the roll, and a housing is supported laterally of each dead air space for enclosing a drive motor and a temperature controller.

THE FIGURES

DETAILED DESCRIPTION OF THE INVENTION

Figure 2:
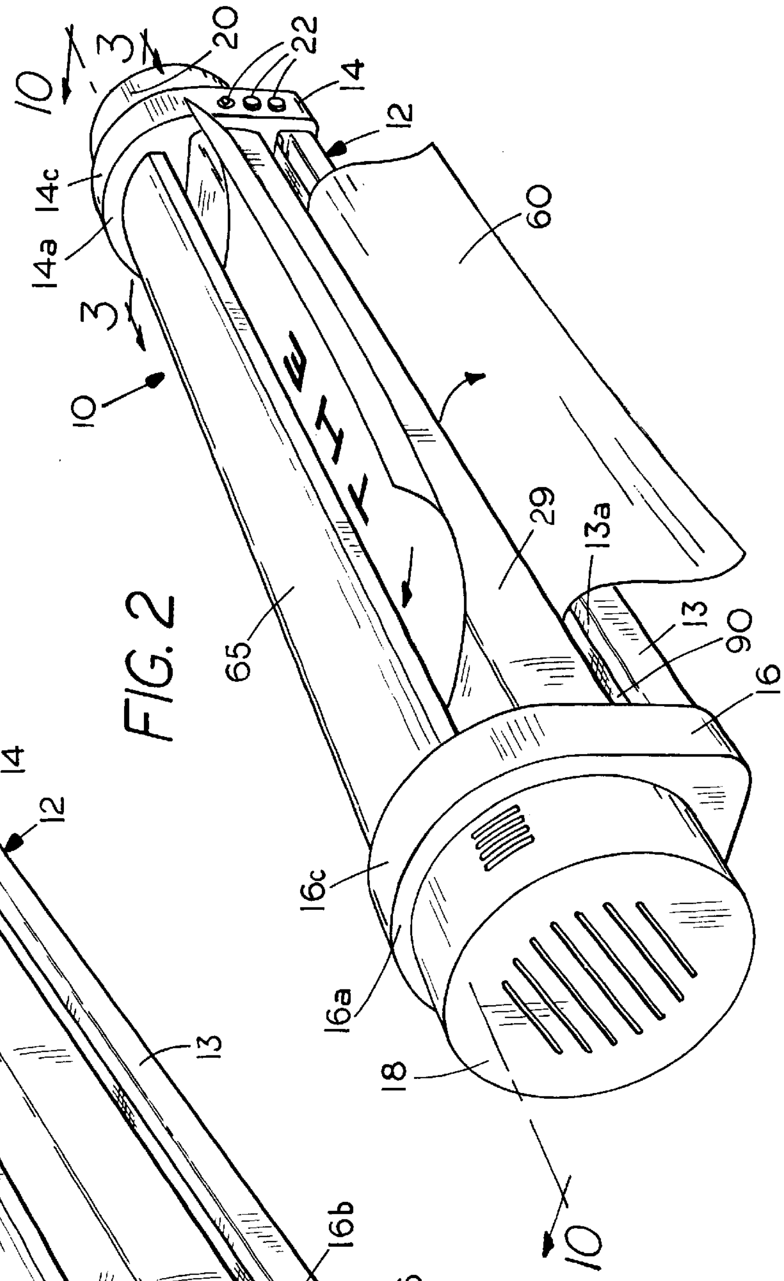
FIG. 2 is a view similar to FIG. 1 showing the photosensitive sheet material passing through the apparatus.
Figure 1:
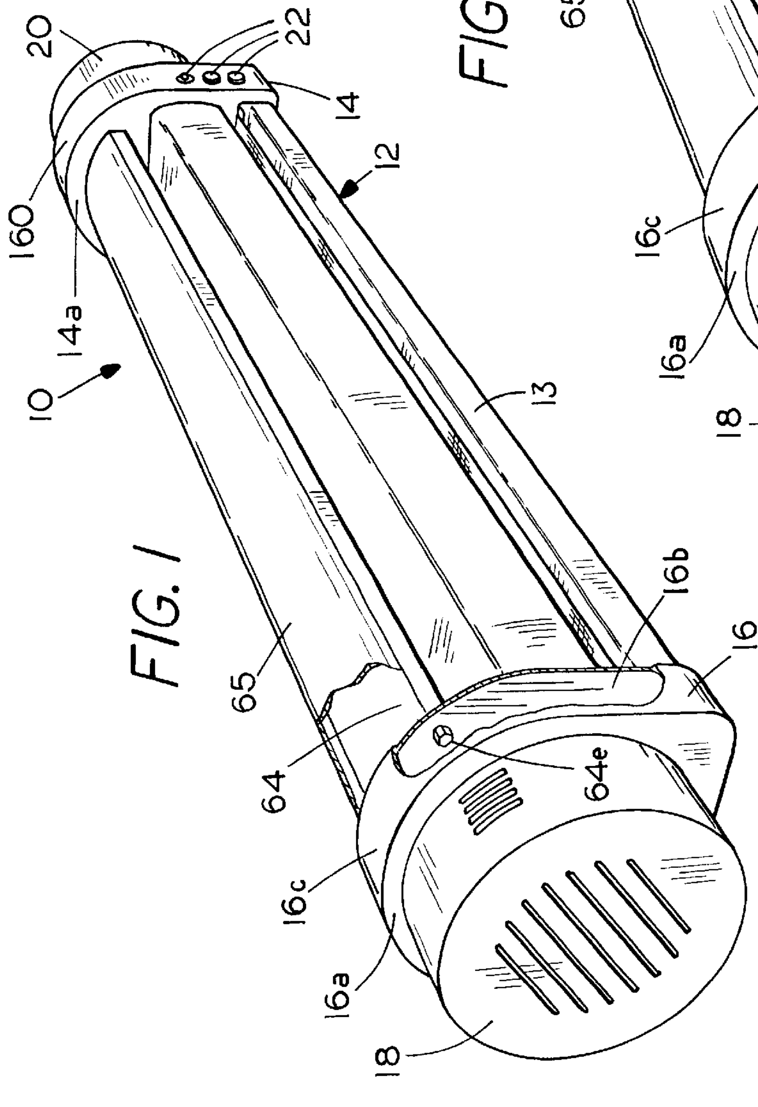
FIG. 1 is a perspective view of the invention partly broken away.

Refer now especially to FIGS. 1–3 and 10 which illustrate the invention by way of example in connection with the desensitization of position proofing paper such as Fuji Copyart™ CP3 Position Proofing Paper. It should be understood that other applications are possible, such as fixing, developing or stabilizing any sensitized material which reacts to heat.

Before being processed using the present invention, negative or positive artwork or text (normally a sheet of film) is placed in contact with the sheet 60. These sheets are then exposed to ultraviolet light. For example, if a negative is used, the photosensitive copy sheet 60 can be held in a vacuum frame and exposed to ultraviolet light to produce a visible image on the copy sheet. The copy sheet 60 is then removed from the artwork. It is at this point that the copy sheet 60 is then desensitized against further exposure to light by heating it using the present apparatus. When, on the other hand, the invention is used for developing sheet material, as in the positive Copyart™ process, the image on the surface of the sheet 60, which is usually yellow in color, is converted to a blue color through the application of heat by the present apparatus.

The apparatus indicated generally at 10 comprises a supporting framework 12 including a base 13 with an outlet 13*a* for the copy paper 60 which is carried through the apparatus by a drive roll 24. Spaced laterally at the ends of the base 13 are hollow roll stands 14 and 16 which are formed from sheet metal. The right roll stand 14 includes a inner vertical wall 14*a* and an outer vertical wall 14*b* (FIG. 10) which are joined by a wall 14*c*. Similarly, the left roll stand 16 has an outer vertical wall 16*a* and an inner vertical wall 16*b* which are joined by wall 16*c*. To the outer wall 16*a* of the roll stand 16 is mounted a housing 18, and on the outer wall 14*b* of the roll stand 14 is mounted a hollow housing 20. Both roll stands 14, 16 are hollow so as to enclose a dead air space. The dead air spaces in the roll stands 14, 16 act as an insulator for reducing the transfer of heat laterally from the ends of the drive roll 24 which, if it occurred, could damage the drive motor and electronic circuitry to be described below. This allows these components to run at a cooler temperature and thereby ensures more reliable operation. It also helps keep both housings 18, 20 at a low enough temperature so that accidental contact will not burn the fingers of the operator. Controls 22, which will be described in more detail below, are provided on the side of the roll stand 14. The distance between the roll stands 14 and 16 is typically about 44½ inches.

The drive roll 24 is journaled for rotation between the roll stands. Drive roll 24 has a cylindrical wall 26 composed of aluminum to which is applied a high friction surface coating 28 such as rubber, e.g. silicone rubber, for frictionally engaging and transporting the copy paper 60 through the apparatus 10. Extending around and enclosing one side of the drive roll 24 is a heating element or hot shoe 64 which will be described in more detail below. On the inlet side of the drive roll 24 is a guide 29 for the copy paper 60, formed from sheet metal and having an upper guide section 29*a* for guiding the paper 60 into the apparatus and a lower panel 29*b*.

Figure 6:
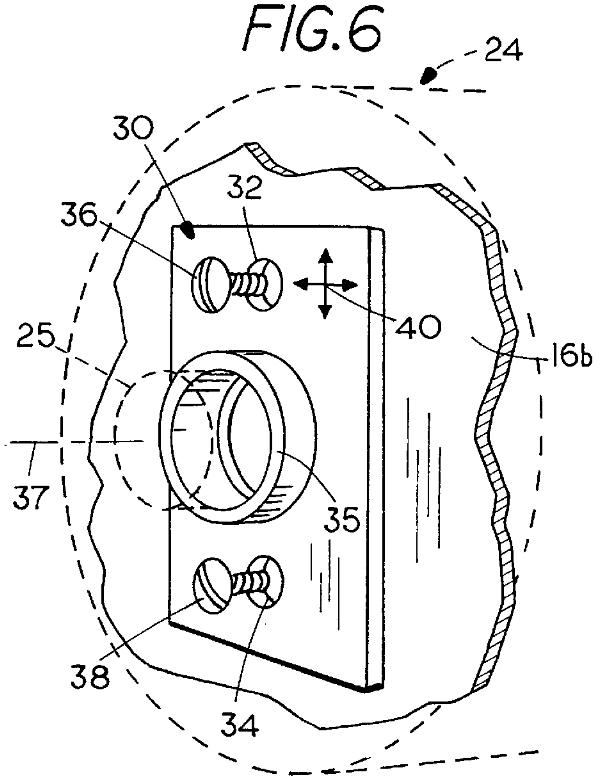
FIG. 6 is an enlarged perspective view of the roller supporting structure at one end of the roller.
Figure 7:
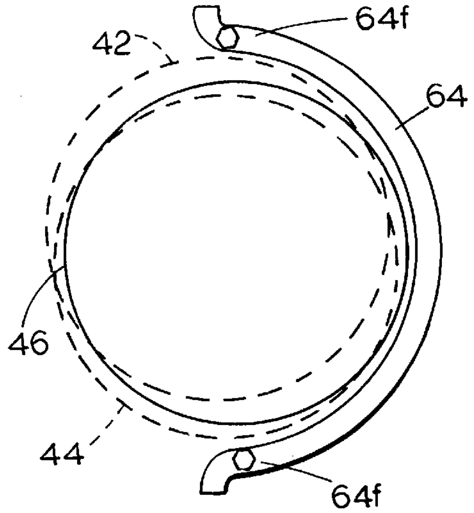
FIG. 7 is a vertical end elevational diagram to illustrate alignment of the roller.

Refer now to FIG. 6 which illustrates one of the bearings for supporting the drive roll 24. Aligned on the central axis 37 of the drive roll 24 at each end is a supporting shaft 25 that extends through one of two bearings 30 (only one of which is shown in FIG. 6). Each bearing 30 consists of a flat plate having a pair of bored openings 32 and 34 above and below a horizontally disposed bearing 35 for shaft 25 which can be provided with a suitable bushing, if desired. Extending through the openings 32 and 34 are fasteners, eg. screws 36 and 38 that are screw threaded into the wall 16*b* or 14*a* as the case may be. The openings 32, 34 are much larger than the screws 36, 38. This allows the bearings 30 to be moved in all directions in a vertical plane, i.e. radially with respect to the longitudinal central axis 37 of the drive roll 24 as shown at 40 until correctly aligned with the hot shoe 64 as shown in FIG. 7. For example, either end of the drive roll 24 can be moved upwardly to the position shown at 42 in FIG. 7 or to the positions 44 or 46, or to any position in between, until aligned with the hot shoe 64 with the proper clearance between drive roll 24 and the hot shoe 64. There is typically a clearance of about 0.01 inch between the surface of the drive roll 24 and slip sheet 62 to accommodate the copy paper 60, but this depends upon the thickness of the copy sheet 60 and can be increased to accommodate sheets of greater thickness. When the correct position is achieved, the screws 36, 38 of each bearing 30 are tightened, thereby locking the bearing 30 at each end of the roll 24 in the desired position. It was discovered that alignment of the drive roll 24 in this manner is important in heating of the copy paper 60 uniformly throughout its width. For example, if the clearance at one end of the drive roll 24 is greater than the other, the pressure applied by the hot shoe 64 to the copy paper 60 at that end will be less than at the other end. Consequently, heat transfer to the copy paper 60 will be less at one end than the other which was found by us to reduce performance results.

During operation, the drive roll 24 is rotated in a given feed direction (FIG. 3) by means of a drive motor 50 having a self-contained speed reducer 54 that is coupled via pulley and timing belt assembly 56 to a drive pulley 58 on shaft 25. Electrical current is supplied to the motor 50 through conductors 52.

Figure 3:
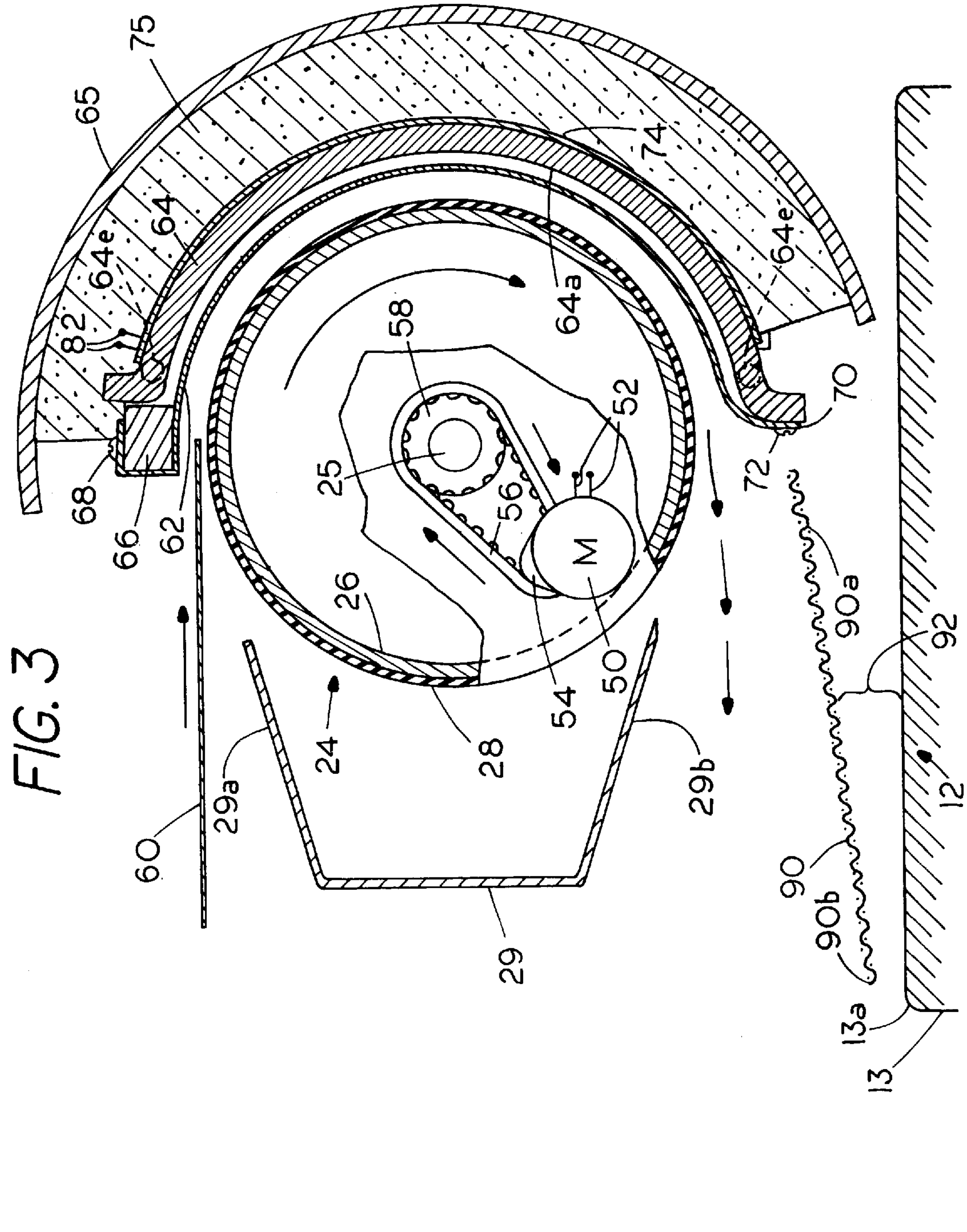
FIG. 3 is a diagrammatic cross-sectional view taken on line 3—3 of FIG. 2 on a larger scale.

Heat is supplied to the copy paper 60 by conduction from the roll 24. As shown in FIG. 3, the hot shoe 64 is enclosed externally by a layer of insulating material such as fiberglass insulation 75. Positioned between the hot shoe 64 and the drive roll 24 is a slippery, low friction material or slip sheet 62 which helps the copy paper 60 slide easily through the apparatus 10 as it is carried forward by the rotation of the drive roll 24. In operation, the slip sheet 62 is close enough to the drive roll 24 so that the copy paper 60 is carried toward the outlet 13*a* due to its frictional contact with high friction surface 28 of the rotating drive roll 24. The slip sheet 62 can comprise any slippery, durable sheet material but preferably comprises a flexible woven fabric such as fiberglass, linen, or a synthetic plastic to which is applied a slippery surface coating such as polytetrafluoroethylene (Teflon®). One preferred slip sheet 62 is preferably Teflon® coated woven fiberglass of 0.96 ounces per square feet, e.g. TFE-GLASS™, a product of the Taconic Company of Petersburgh, N.Y. The slip sheet 62 is fixed in place by being connected along its upper edge to a fixed longitudinally extending supporting bar 66 that is fastened at each end to the roll stands 14 and 16. Sheet 62 can be secured to the fixed supporting bar 66 by means of fasteners such as screws 68. Its lower edge 70 is secured to the lower edge of the hot shoe 64 by fasteners such as screws 62 (only one of which is shown in FIG. 3). The slip sheet 62 is thus sandwiched between the drive roll 24 and the hot shoe 64 so that heat from the roll 24 is transferred into the copy paper 60 by conduction. A drive roll 24 that is 4.5 inches in diameter can be driven at a surface speed of about 77 inches per minute. This will provide a treatment time of about 5.5 seconds at about 235° F.±5° F.

Figure 4:
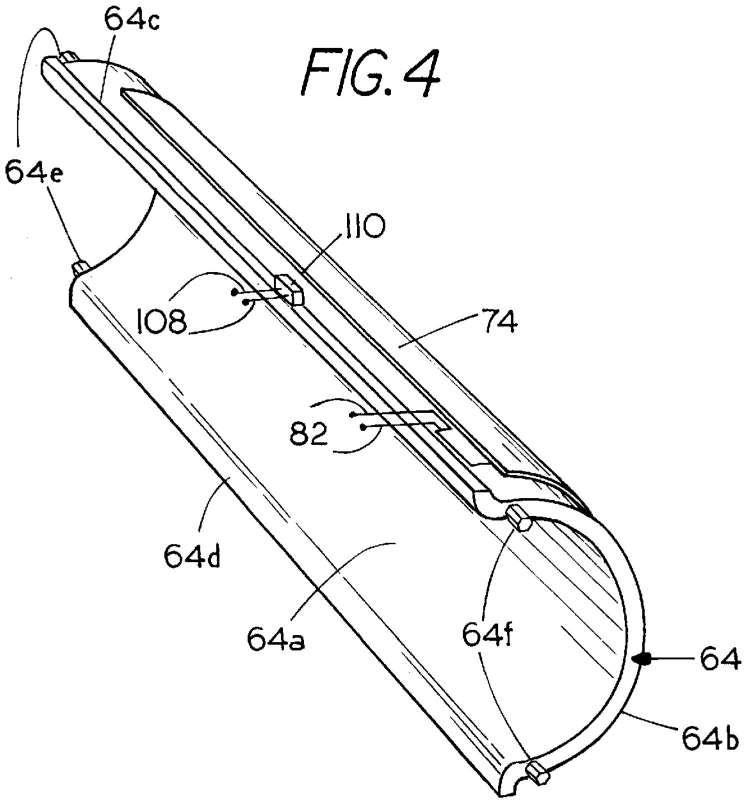
FIG. 4 is a perspective view of the hot shoe and associated structure.
Figure 5:
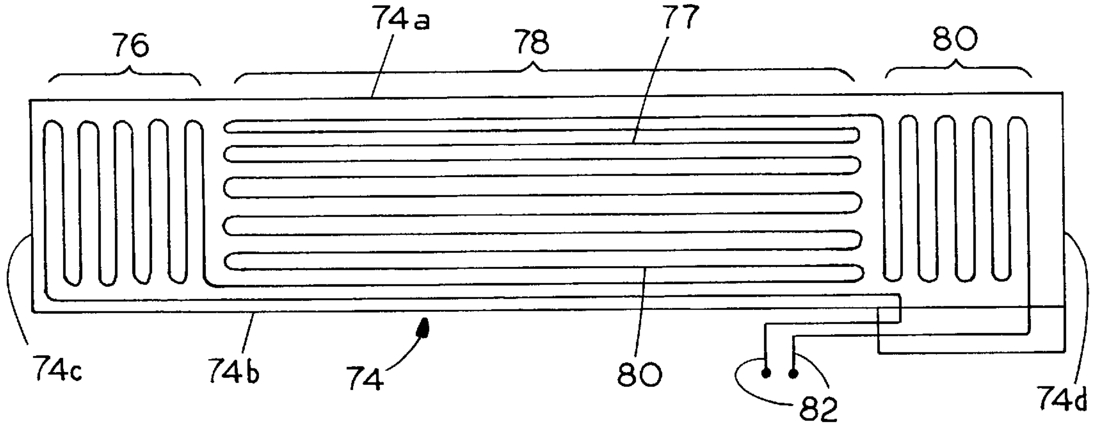
FIG. 5 is a plan view of the heating blanket.

Refer now to FIGS. 4 and 5 which illustrate the hot shoe 64. The hot shoe 64 includes an inner concave cylindrical surface 64*a* facing the drive roll 24, a convex outer surface 64*b* and transversely extending, parallel upper and lower edges 64*c*, 64*d* . Extending laterally from the upper and lower edges of the hot shoe 64 are hexagonal mounting lugs 64*e* and 64*f* which support the hot shoe 64 in a fixed position by extending through rubber grommets within corresponding openings in the adjacent walls 14*a*, 16*b* to hold the hot shoe 64 in place on the framework 12.

Heat is applied to the hot shoe 64 by means of a flexible heating blanket 74 which can be secured to the outside surface 64*b* of the hot shoe 64 by means of adhesive, vulcanized rubber or suitable fasteners (not shown). The heating blanket 74 can be formed from layers of rubber, such as silicone rubber, having upper and lower edges 74*a*, 74*b* and side edges 74*c*, 74*d*. Between the layers of rubber in the blanket 74 is laminated a 1500-watt electrical resistance heater 77 for applying heat to the hot shoe 64 throughout its length and for heating the hot shoe 64 differentially in bilaterally symmetrical zones proceeding laterally from a center point and including a relatively cool heated zone 78 at the center, bordered by two somewhat warmer zones 76 and 80 proximate each end of the hot shoe 64 (FIG. 5). While temperatures can be varied depending upon the type and brand of copy paper 60 employed, in the process of desensitizing position-proofing paper, excellent results have been achieved by having the zones 76 and 80 set at the desired temperature, say, about 270° F. and the cooler central zone 78 set to maintain the center portion of the heating blanket 74 and corresponding central section of the hot shoe 64 at a lower temperature, 20° F. to 40° F. cooler, say, about 250° F. By maintaining a bilaterally symmetrical heating differential, it was discovered that the temperature of the drive roll 24 itself can be maintained at a more even temperature than used heretofore, typically about 235° F.±5° F. and most preferably about 235° F.±2.5° F. The zones 76 and 80 are typically wired using electrical resistance wire to produce about 10 watts per square inch while the central zone 78 is typically wired to produce about 5 watts per square inch. It is theorized that the success of the present invention in maintaining a uniform temperature throughout the length of the drive roll 24 is achieved by compensation for the greater heat loss at each end of the drive roll 24. The increased heating at each end is preferably accomplished using wire having greater resistance per lineal unit in the zones 76 and 80 than that used in zone 78.

Figure 8:
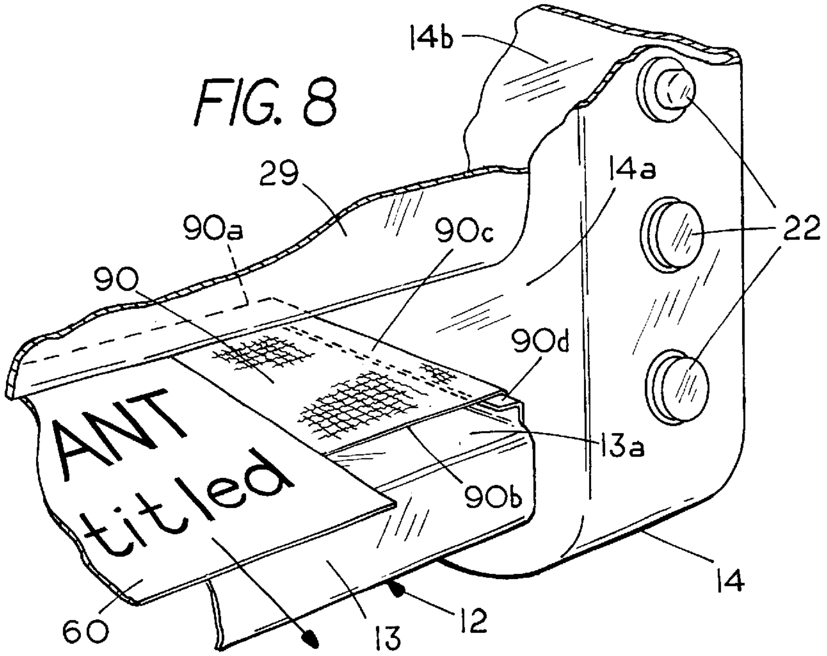
FIG. 8 is a partial perspective view of the right end of the apparatus shown in FIGS. 1 and 2 on a larger scale.

Refer now to FIGS. 2, 3 and 8. As shown in the figures there is provided an outlet tray or platform 90 which is spaced above the outlet 13*a*, typically by a distance of about one-quarter inch to about one-half inch. However, at this temperature a substantial amount of moisture vapor and steam is given off by the copy paper 60 which, it was found, is capable of damaging the finished copy by causing streaks on the paper. To prevent damage to the copy payer 60, the tray 90 is used to receive and transfer the freshly processed copy paper 60 out of the apparatus 10 as shown in FIG. 8. The tray 90 has a leading edge 90*a* closest to the hot shoe 64, an outer edge 90*b*, and laterally spaced side edges 90*c* (only one of which is shown in FIG. 8) adjacent the roll stands 14, 16. The tray 90 is stretched between a pair of identical brackets 90*d* which are attached rigidly to the roll stands 14, 16 so that the tray 90 acts as a chute or slide for carrying the finished product out of the apparatus 10. The outer edge 90*b* is preferably slightly lower than the leading edge 90*a* so that the tray 90 is sloped downwardly proceeding toward its outer edge. It was found that the heating of the copy paper 60 in the apparatus 10 liberates a substantial amount of moisture vapor and steam. The tray 90 is formed from a condensation inhibiting material that will prevent the hot moisture vapor liberated from the copy paper 60 from being deposited on the copy sheet which, if it occurred, could damage the image. The tray 90 is preferably a screen woven from polytetrafluoroethylene fibers, e.g Teflon®. A variety of condensation inhibiting materials can be employed including, but not limited to, synthetic resins, mineral fibers including glass fibers, mineral wool, asbestos, synthetic polymeric fibers, and the like. Other examples of condensation inhibiting materials include woven or nonwoven flexible sheet material formed from nylon, Dacron, Orlon, rayon, polyester, polyethylene, polypropylene, Kevlar® and the like as well as natural fibers such as silk, wool, cotton or other cellulosic fibers woven to form an open-weave cloth with or without a sizing agent. A lightweight fiberglass cloth or other formations structure coated with a friction reducing substance, e.g. polytetrafluoroethylene (Teflon®) is preferred. One example is a cloth sold under the name TSE-GLASS Breather Fabric by the Taconic Corporation of Petersburgh, N.Y.

As best seen in FIGS. 3 and 8, as the finished copy paper 60 emerges from between the hot shoe 64 and the drive roll 24, moisture vapor and steam will be emitted between the leading edge 90*a* of the tray 90 and the base 13. Some of this moisture will condense on the upper surface of the base 13 between the hot shoe 64 and the outlet edge 13*a* of the base 13. However, since the tray 90 is formed from a condensation inhibiting substance, the condensed moisture cannot be transferred back to the paper 60. This protects the copy paper 60 from streaking or other damage that could otherwise be caused by contact with condensed moisture.

Figure 9:
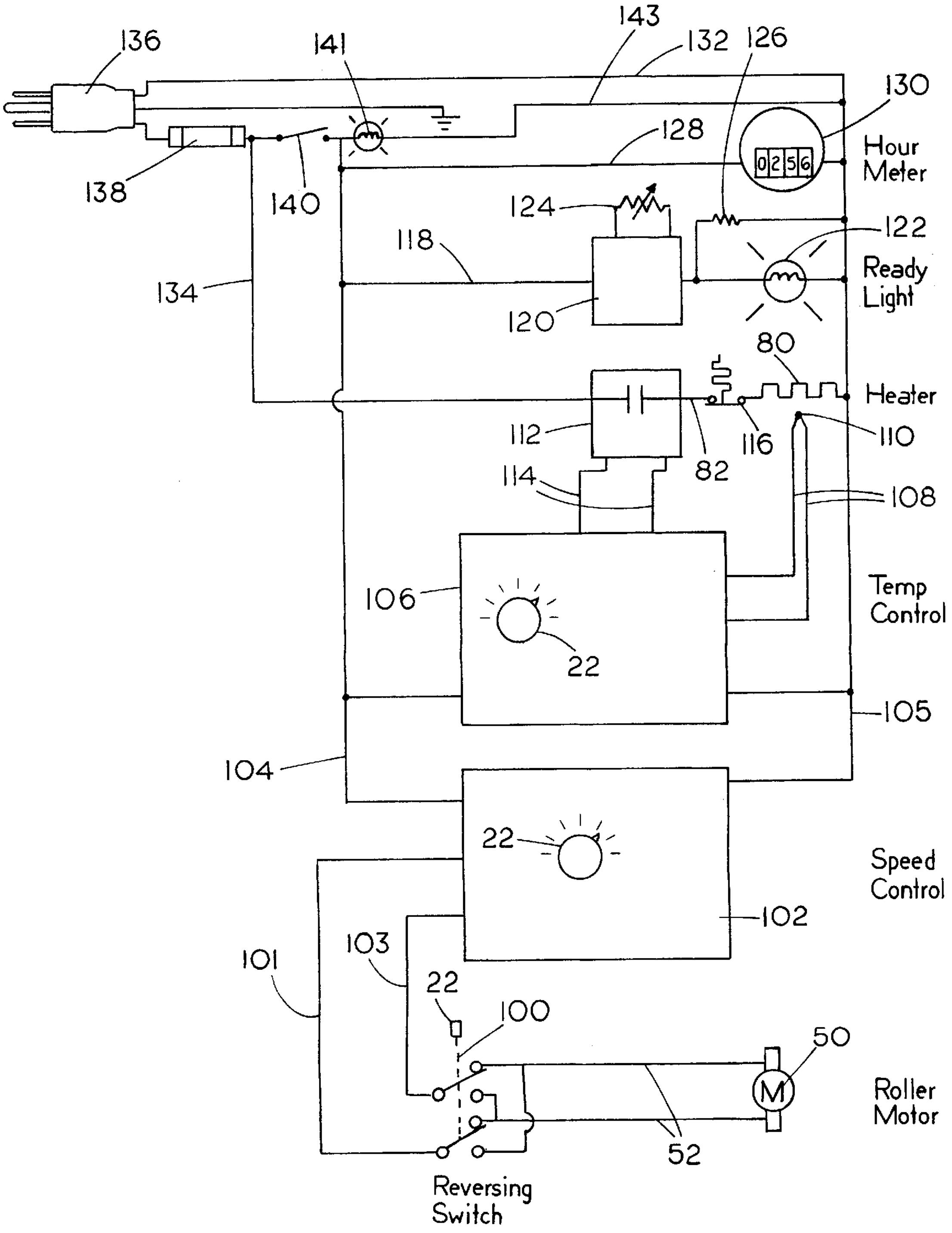
FIG. 9 is a schematic wiring diagram.
Figure 10:
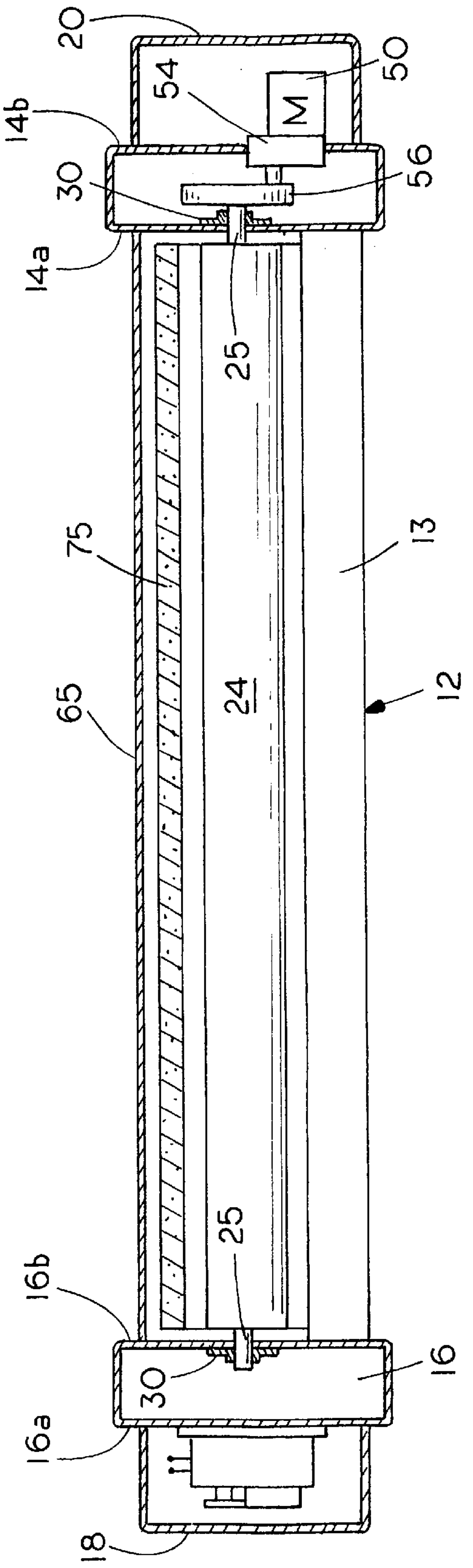
FIG. 10 is a transverse vertical sectional view taken on line 10—10 of FIG. 2.

Refer now to FIG. 9 which illustrates in schematic form a preferred circuit that can be employed with the invention. In this diagram, electrical current is carried from wall plug 136 through conductors 132, 134 via fuse 138 to an on/off switch 140 to an indicator light 141 and to conductor 143. Switch 140 carries current through lines 104 and 105 to an hour meter 130 via conductor 128 and through conductor 118 to a ready light 122 which is turned on by a timer 120 that is preferably set at the factory but can, if desired, be changed by adjusting a potentiometer 124 to correspond with the time that it normally takes the heater to reach the desired operating temperature (30 minutes). The ready light 122 can be wired in parallel with a dropping resistor 126. Wired between conductor 134 and conductor 105 is the heater 77. The temperature of the heater 77 is controlled by means of a suitable temperature control circuit 106 that is wired via conductors 114 to a relay 112. The heater 77 is protected by means of a overheat thermostat 116 which has the function of a circuit breaker. The temperature controller 106 receives temperature information from a thermocouple 110 that is wired to it via conductors 108. Also wired across the conductors 104, 105 is a speed controller 102 having a control dial 22 that is most preferably set at the factory. The speed controller 102 is wired via conductors 101, 103 through a reversing switch 100 and conductors 52 to the drive motor 50 for the drive roll 24. The operator can use the reversing switch 100 whenever desired to clear jams and remove paper from the apparatus 10.

The invention has proved very reliable in operation and is capable of desensitizing position proofing paper in a manner that is more precise than heretofore possible, thereby maintaining a higher quality image. This is achieved in part by maintaining more uniform temperature throughout the copy sheet 60 from one edge to the other through the provision of a heating differential as described above as well as by reducing the loss of heat at each end of the drive roll 24 due to the dead air space in each of the roll stands 14 and 16. Moreover, besides keeping the copy paper 60 at a more uniform temperature, the high mass aluminum roll 24 helps to maintain temperature consistency from one hour to the next during operation. Because of the insulating quality of the dead air space in the roll stands 14 and 16, no cooling fan is required. The invention also avoids the possibility that the condensed moisture liberated during heating can come into contact with the freshly treated copy paper 60 as it emerges from the apparatus 10. The invention consequently provides better tone reproduction, increased image control and visibility, along with clear, multiple color breaks. In a typical case, if the copy paper 60 is not desensitized, it will gradually turn blue. The present invention prevents this while maintaining the image on the copy sheet in excellent condition. It is possible to use the invention with both positive and negative copy paper. The invention can be used with wide sheets, e.g., sheets as wide as 40 inches. These processing advantages can be accomplished even at relatively high production speeds of about 77 inches per minute. Because of the precise heating, it is possible to move the drive roll 24 closer to the hot shoe 64 and thereby increase production rates since the heat is transferred more efficiently to the copy paper 60.

To operate the present apparatus 10, the electrical current is turned on by closing switch 140 and the heater 77 is allowed to reach the preset temperature. When the heater 77 has reached the proper temperature, the ready light 122 will go on. The copy sheets 60 are then inserted into the apparatus 10 as shown in FIG. 3 and are carried through the apparatus by the rotation of the drive roll 24.

The invention has shown itself to be highly effective at fixing or desensitizing the photosensitive copy sheet against further exposure to light while preserving a high quality image.

Many variations of the present invention within the scope of the appended claims will be apparent to those skilled in the art once the principles described herein are understood.

What is claimed is:

1. A rotary apparatus for advancing and thermally developing or desensitizing images carried on flexible photosensitive copy sheet material, comprising, a supporting framework, a drive roll supported on the framework for rotation about a horizontal central axis to carry said flexible sheet material through the apparatus, a motor connected to the drive roll for imparting rotation to the roll, a fixed hot shoe mounted on the framework proximate to the drive roll that is heated so as to heat the sheet material exteriorly of the drive roll for thermally developing images on said sheet material, a fixed slip sheet supported in fixed relationship on the framework and interposed between the drive roll and the hot shoe to enable the sheet material to slide through the apparatus relative to the fixed hot shoe, movable bearings for the drive roll that are supported upon the framework for movement relative to the framework to allow the drive roll to be positioned so as to establish a predetermined clearance between the hot shoe and the drive roll, and means for securing each bearing in place on the framework.

2. The apparatus of claim 1 wherein the means for securing each bearing in place is a fastener for locking each bearing in a fixed position on the supporting framework after the clearance has been established.

3. The apparatus of claim 1 wherein the hot shoe comprises an arcuate shoe member having a concave, generally cylindrical surface facing the drive roll and a heater is connected in heat conductive relationship to the hot shoe for transferring heat to said sheet material through the hot shoe and the slip sheet.

4. The apparatus of claim 1 wherein the slip sheet comprises a sheet of flexible material having a surface facing the drive roll that has a coefficient of friction that enables the copy sheet to slide on the slip sheet as it is carried by frictional engagement with the drive roll.

5. The apparatus of claim 4 wherein the drive roll has an exterior high friction surface for engaging and transferring the copy sheet through the apparatus.

6. The apparatus of claim 1 wherein said surface of the slip sheet that faces the drive roll is coated with a polymer having a low coefficient of friction.

7. The apparatus of claim 6 wherein the polymer comprises Teflon.

8. A rotary apparatus for advancing and thermally developing or desensitizing images carried on flexible photosensitive copy sheet material, comprising, a supporting framework, a drive roll mounted on the framework for rotation about a central axis for carrying said flexible sheet material through the apparatus, a motor for imparting rotation to the drive roll, a curved hot shoe at least partially enclosing the drive roll and having a center portion and two end portions, said hot shoe being heated so as to heat the sheet material exteriorly of the drive roll for thermally developing images on said sheet material as rotation of the drive roll slides the sheet material through the apparatus relative to the hot shoe, a heater for heating the hot shoe from one end to the other, the heater heating the hot shoe differentially in two zones that are distributed laterally of the center of the hot shoe to provide a heated zone near the center portion of the hot shoe that is heated less than each end portion of the hot shoe and the drive roll is heated solely from the outside.

9. The apparatus of claim 8 wherein the heater comprises an electrical resistance heater connected in heat conductive relationship to the hot shoe and said heater is constructed with zones at each end to heat the hot shoe to a higher temperature proximate each end thereof than at the center thereof.

10. The apparatus of claim 8 wherein the differential heating of the hot shoe heats the drive roll to a relatively even temperature throughout its length to thereby heat the copy sheet evenly throughout the width thereof as the sheet is carried through the apparatus by the drive roll.

11. The apparatus of claim 8 wherein the heater is an electrical resistance heater embedded in a flexible supporting matrix affixed to the hot shoe.

12. The apparatus of claim 8 wherein a temperature controller is wired to the heater and a temperature sensor that is operatively connected to the temperature controller is placed in heat conductive relationship to the hot shoe.

13. A rotary apparatus for advancing and thermally developing or desensitizing images carried on flexible photosensitive copy sheet material, comprising, a supporting framework, a drive roll mounted on the framework for rotation about a central axis for carrying said flexible copy sheet material through the apparatus, a motor for imparting rotation to the drive roll, a hot shoe proximate to the drive roll that is heated so as to heat the sheet material exteriorly of the drive roll for thermally developing images on said sheet material, a heater for heating the hot shoe, the supporting framework includes a roll stand at each end of the framework, at least one of the roll stands is hollow provide a dead air space for reducing heat transfer laterally thereof, and a housing connected to an outside surface of at least one roll stand and extending laterally thereof to enclose a drive motor or a temperature controller.

14. The apparatus of claim 13 wherein the supporting framework includes two such hollow roll stands, each hollow roll stand is located at an end of the framework for supporting an end of the drive roll, each of the roll stands has one such housing connected to an outside surface thereof so as to extend laterally therefrom, and a drive motor is mounted in a first one of said housings and a temperature controller is mounted in a second one of said housings.

15. The apparatus of claim 13 wherein a thermal insulator encloses an outer surface of the hot shoe and extends between the hollow roll stands.

16. A rotary apparatus for advancing and thermally developing or desensitizing images carried on flexible photosensitive copy sheet material, comprising, a supporting framework, a drive roll is mounted on the framework for rotation about a central axis for carrying said flexible sheet material through the apparatus, a motor for imparting rotation to the drive roll, a curved hot shoe proximate the drive roll and partially enclosing the roll, a heater for heating the hot shoe, and an outlet tray formed from a formations condensation-inhibiting material suspended on the framework for receiving and transferring sheet material passing out of the apparatus to prevent condensed moisture and enhance the escape of steam or hot moisture vapor that is driven off the sheet material during heating thereof from streaking or otherwise damaging the copy sheet material.

17. The apparatus of claim 16 wherein the outlet tray comprises a screen woven from a fibrous material.

18. The apparatus of claim 16 wherein the tray comprises a woven cloth.

19. The apparatus of claim 18 wherein the cloth is formed from a synthetic resin.

20. The apparatus of claim 18 wherein the cloth is fiberglass cloth.

21. The apparatus of claim 16 wherein the framework has a hollow roll stand containing a dead air space at each end thereof and the motor is mounted laterally of one roll stand and a temperature controller is mounted laterally of the other roll stand.

22. The apparatus of claim 16 wherein means is provided for allowing the clearance between the drive roll and the hot shoe to be changed to a predetermined value.

23. The apparatus of claim 16 wherein the heater heats the hot shoe differentially proceeding from a center point toward laterally spaced ends of the hot shoe to provide a relatively cool heated zone between the ends of the hot shoe and a wanner heated zone at each end of the hot shoe.

* * * * *